Figure 5:
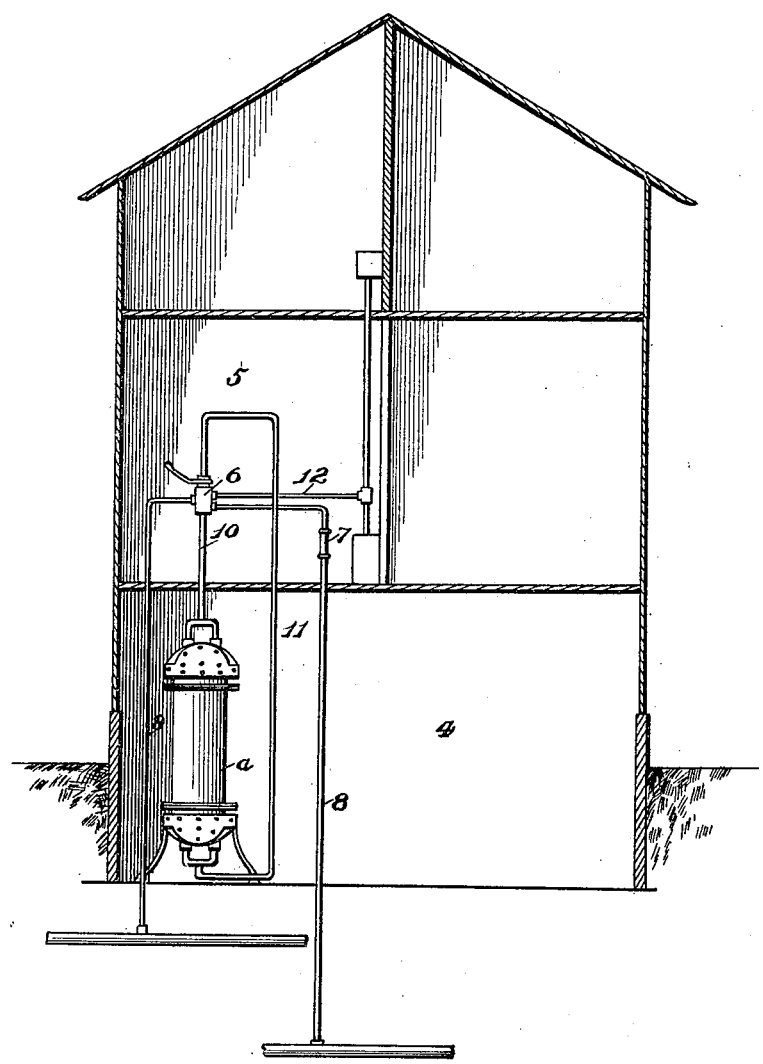

No. 670,094. Patented Mar. 19, 1901.
E. F. BERRY.
PRESSURE WATER FILTER.
(Application filed Dec. 5, 1900.)
(No Model.) 2 Sheets—Sheet 1.
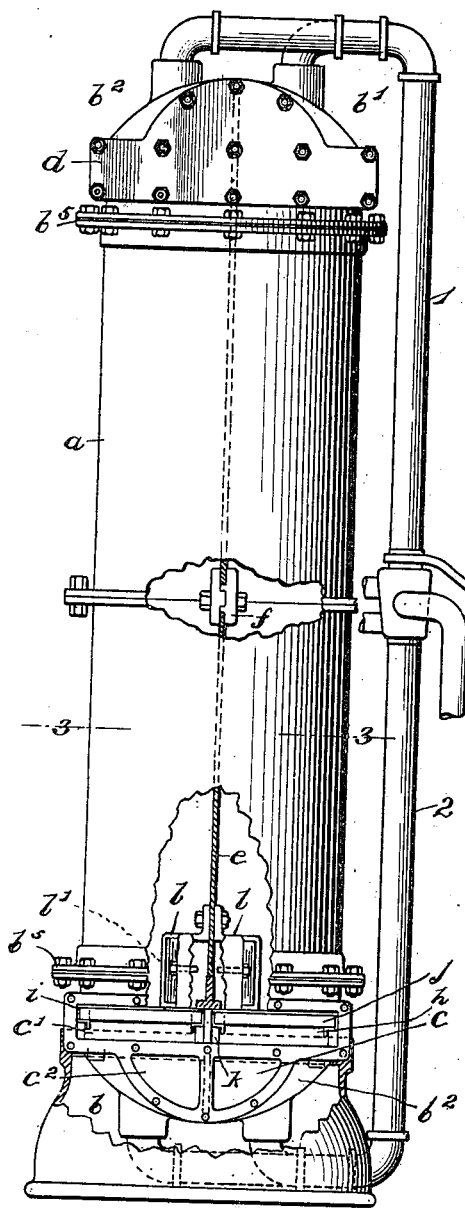
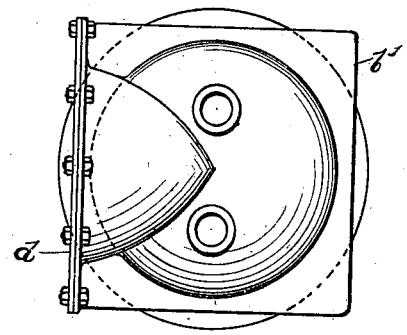
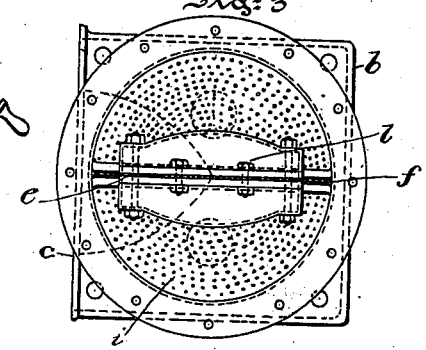
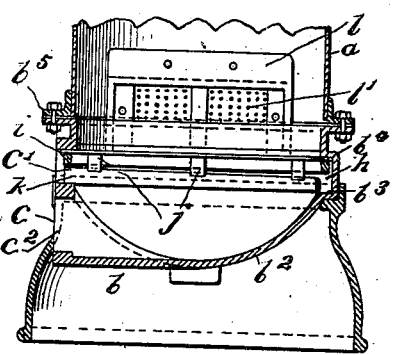
WITNESSES:
INVENTOR
Edward F. Berry
BY
ATTORNEY No. 670,094. Patented Mar. 19, 1901.
E. F. BERRY.
PRESSURE WATER FILTER.
(Application filed Dec. 5, 1900.)
(No Model.) 2 Sheets—Sheet 2.

UNITED STATES PATENT OFFICE.

EDWARD F. BERRY, OF PHILADELPHIA, PENNSYLVANIA.

PRESSURE WATER-FILTER.

SPECIFICATION forming part of Letters Patent No. 670,094, dated March 19, 1901.

Application filed December 5, 1900. Serial No. 38,811. (No model.)

*To all whom it may concern:*

Be it known that I, EDWARD F. BERRY, a citizen of the United States, residing at Philadelphia, in the county of Philadelphia and State of Pennsylvania, have invented a certain new and useful Pressure Water-Filter, of which the following is a specification.

Filters known more generally in the arts as "pressure water-filters" have proved in use unreliable and unsatisfactory in several particulars.

First, the perforate portions are generally placed between the flanges of the various sections that go to make up the filter-cylinder, so that in order to clean them it is necessary to dismember the entire filter, including its pipe and valve connections, and also in most instances to remove the bed material.

Second, in the course of nine months there is deposited upon the walls of the water-spaces a formation consisting of hard shell, in some instances filled with a gas, as bubbles. A portion of this shell washes off and appears in the filtered water as soft red specks, so that the walls of the water-spaces require constant cleansing, and this is often neglected, because to do so requires dismemberment of the parts of the filter.

Third, the bed or filtering material tends to pack upon and clog up the perforate portions and thus, cut off the supply of filtered water, and this is especially true where a pump is attached to the filter, because the pump creates a vacuum and tends to draw the material downward and pack it harder at every stroke of the pump.

Fourth, in pressure-filters (and speaking now more generally of the larger type) the water passing through the filter-bed penetrates its center, and thus packs the sides of the bed hard and leaves the center more or less loose, and a bed in this condition is of comparatively little use as a filtering medium.

One object of the present invention is to overcome the above-recited disadvantageous features and to construct a filter every necessary part of which can be readily cleaned and properly attended to without dismembering the part and which will be thoroughly reliable and efficient in use; and a further object is to provide filter apparatus the heavy parts of which can be conveniently located—for example, underground—while at the same time the apparatus can be normally cleaned and operated from a more convenient station, whereby the trouble of cleaning is reduced and regular attention promoted.

To these and other ends hereinafter set forth the invention consists of the improvements hereinafter described and claimed.

The nature, characteristic features, and scope of the invention will be more readily understood from the following description, taken in connection with the accompanying drawings, forming part hereof, and in which—

Figure 1 is a side elevational view, partly in section, illustrating a filter embodying the invention. Fig. 2 is a top or plan view of the same. Fig. 3 is a sectional view taken on the line 3 3 of Fig. 1. Fig. 4 is a central sectional view taken at right angles to the plane of Fig. 1 and showing the bottom part of the filter; and Fig. 5 is a view, partly in section and partly in elevation, illustrating features of the invention.

In the drawings, $a$ is the cylinder that goes to make up the body of the filter. This body or cylinder may comprise sections joined together in the usual manner—for example, by bolting their flanges together. To the top and bottom of this cylinder $a$ are bolted or otherwise secured heads $b$ and $b'$. As shown in the drawings, the body $a$ is circular in cross-section, while each head is square and is provided with a generally spherical water-chamber $b^2$. One of the sides of the square parts of each of the heads is provided with an opening $c$, adapted to be closed by a detachable cover-plate $d$. The heads are identical, and each is fitted internally with shoulders $b^3$ and $b^4$ and with a flange $b^5$ for purposes to be presently described. Extending from the base of the lower head to the top of the upper head is a central partition $e$, which divides the filter longitudinally in two.

In order to allow for the addition of extra sections of a filter-body, use may be made of a coupling, as $f$, for connecting additional sections of partition $e$.

$h$ represents compartments located in the square portions of the heads and adapted to receive perforate plates $i$. These perforate plates may be of any variety of mesh, according to the character of filtering-bed used and the water to be filtered. These perforate plates are held in place by means of grates $j$, which in turn are held in place by suitable means, as wedges $k$. The perforated plates $i$, as well as the walls of the water-chambers $b^2$, may be readily cleaned without dismembering the filter or interfering with its connections. For this purpose the cover-plate $d$ is removed, whereupon access may be had to the water-chamber $b^2$ by way of the portion $c^2$ of the opening $c$. Upon the removal of the wedges $k$ the grates and perforated plates fall and may be easily removed through the portion $c'$ of the opening $c$. Ordinarily the filtering material being somewhat wet is self-sustaining when the perforated plate has been removed. However, if it should fall it can be readily withdrawn and introduced at the top of the filter by way of the opening which is provided in the top head. In this way it is possible to rapidly and conveniently and in a very short time clean not only the perforated plate, but also the internal walls of the head, and it may be noted that the unions of the heads with the cylindrical body are not disturbed.

$l$ is a housing located at the base of the filtering material. As shown, there are two housings, and they are secured to opposite faces of the partition $e$. The side walls $l'$ of these housings are perforated. There is a tendency in filters for the filtering medium to pack so hard upon the perforated plate $i$ as to exclude in whole or in part the passage of water. Since the perforated side walls $l'$ extend into the filtering material, it follows that they afford an escape for the water even though the filtering material is packed hard onto the perforated plates, it being understood that the perforated side walls $l'$ are arranged substantially at right angles with the perforated plates. In cleaning the filtering material jets of water escape through the perforations in the walls $l'$ and intercept or cross jets of water rising from the perforations in the plates $i$, so that these jets or streams of water circulate substantially at right angles, and therefore tend to thoroughly wash and cleanse the filtering material. The water connections or pipes 1 and 2 branch at the heads of the filter, so as to discharge and receive on opposite sides of the partition $e$. The effect of this arrangement is to reduce the area of filtering material in proportion to the area of the inlet and outlet connections, and in this way the tendency which exists in most filters for the water to traverse the center line of the filtering-bed is overcome. By the described arrangement the water is caused to percolate or pass through the entire mass of filtering material instead of through the center of it, which latter operation caused the filtering material to pack all around the edges of the body, leaving a path of exceedingly loose material at the center, which path of loose material did not properly filter.

Referring to Fig. 5, 4 is a filter-compartment, which may be underground and in which are located the heavy parts of the filter, or, in fact, several filters arranged for coöperative action. 5 is a station which is reasonably convenient for the attendant in charge. In the compartment 5 are located the controlling-valve 6 of the filter or set of filters and also the sight-gage 7, which is interposed in the connection 8, that leads to the sewer. A pipe 9 is led from the supply-water to the compartment 5 and is there connected with the valve 6. The filter connections 10 and 11 are also led to the compartment 5 and are similarly connected with the valve 6. The valve 6 is also connected with the distribution system 12. The attendant in charge may therefore not have to go down into the subterranean or other inconvenient filter-chamber 4 in order to clean the filter in the ordinary way, but may, on the contrary, visit the convenient compartment 5 and by reference to the sight-gage 7 and by proper manipulation of the valve 6 effect a thorough washing of the filtering material. In this way more frequent washings and better results are insured than can be obtained where the controlling mechanism is connected with and attached to the filter-bodies or some of their parts.

It will be obvious to those skilled in the art to which the invention relates that modifications may be made in details without departing from the spirit thereof. Hence I do not limit myself to the precise construction and arrangement of parts hereinabove set forth and illustrated in the accompanying drawings; but,

Having thus described the nature and objects of the invention, what I claim as new, and desire to secure by Letters Patent, is—

1. A filter comprising a casing having top and bottom heads arranged over and detachably secured to its respective ends, and removable cover-plates applied to said heads, substantially as described.

2. A filter comprising a casing, top and bottom heads detachably secured over the ends of said casing, inlet and outlet water connections applied to said heads, water-compartments contained within said heads, and cover-plates removably attached to said heads for obtaining access to said water-compartments, substantially as described.

3. A filter comprising a casing, top and bottom heads detachably secured over the ends of said casing and provided with removable cover-plates, perforate partitions removably mounted in said heads, and means for holding said perforate partitions in position, substantially as described.

4. A filter comprising a casing, heads attached to said casing, and a partition extending from the bottom of the bottom head to the top of the top head, substantially as described.

5. A filter comprising a casing, heads detachably secured to said casing and provided with inlet and outlet water connections, perforate partitions removably secured in said heads, a bed or filter material interposed between the two perforate partitions, a central partition extending from the bottom head to the top head, and housings attached to said partition and located in the bed material, said housings being provided with perforate sides at right angles to the perforate partitions, substantially as described.

6. A filter-housing consisting of a cylindrical body part adapted to contain filtering material, heads secured to the ends of the body part and each consisting of a squared portion having internal shoulders, a generally hemispherical water-compartment and a circular portion adapted to the body portion, and the squared portions of the hemispherical portions being provided with openings, detachable cover-plates for said openings, perforate plates and grates located in the squared portions, and wedges for detachably securing the plates and grates in respect to the shoulders, substantially as described.

7. The combination of a circular filter-body, heads applied to its ends, perforate plates mounted in the heads, a central partition extending from head to head and dividing the body and heads longitudinally, and water connections equipped with branches that penetrate the heads on opposite sides of the partition, substantially as described.

8. A filter plant comprising the combination of a filter-chamber and a separate compartment, a filter located in the filter-chamber, a filter-controlling valve and a sight-gage located in the compartment, pipe connections extending from the chamber to the compartment and connecting the water-space of the filter and the fluid-ways of the valve and sight-gage, and water and sewer connections to and from the compartment and through the fluid-ways of the valve and the water-space of the filter, substantially as described.

In testimony whereof I have hereunto signed my name.

EDWARD F. BERRY.

Witnesses:
K. M. GILLIGAN,
W. J. JACKSON.